United States Patent
Hao et al.

(10) Patent No.: US 10,555,149 B2
(45) Date of Patent: Feb. 4, 2020

(54) DETERMINING A PROBABILITY OF A RELATIONSHIP BETWEEN LAYERS OF GEOGRAPHIC INFORMATION SYSTEM DATA

(71) Applicant: Verizon Patent and Licensing Inc., Arlington, VA (US)

(72) Inventors: Jianxiu Hao, Acton, MA (US); Fenglin Yin, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 976 days.

(21) Appl. No.: 15/089,832

(22) Filed: Apr. 4, 2016

(65) Prior Publication Data
US 2017/0286855 A1  Oct. 5, 2017

(51) Int. Cl.
*H04W 4/70* (2018.01)
*H04W 4/021* (2018.01)
*G06F 16/29* (2019.01)

(52) U.S. Cl.
CPC .............. *H04W 4/70* (2018.02); *G06F 16/29* (2019.01); *H04W 4/021* (2013.01)

(58) Field of Classification Search
CPC .......... G06F 16/29; H04W 4/021; H04W 4/70
See application file for complete search history.

(56) References Cited

U.S. PATENT DOCUMENTS

| | | | |
|---|---|---|---|
| 9,110,894 B2 * | 8/2015 | Zhang | G06Q 30/0261 |
| 2012/0109944 A1 * | 5/2012 | Hao | G06F 16/9535 |
| | | | 707/723 |

OTHER PUBLICATIONS

Wikipedia, "Geographic information system," https://en.wikipedia.org/wiki/Geographic_information_system, Apr. 2, 2016, 19 pages.
Wikipedia, "Geospatial analysis," https://en.wikipedia.org/wiki/Geospatial_analysis, Dec. 18, 2015, 4 pages.
Wikipedia, "Location-based service," https://en.wikipedia.org/wiki/Location-based_service, Mar. 17, 2016, 11 pages.
Wikipedia, "Quadtree," https://en.wikipedia.org/wiki/Quadtree, Mar. 11, 2016, 7 pages.

* cited by examiner

*Primary Examiner* — Benjamin P Geib

(57) ABSTRACT

A device may receive first data items and second data items that may have been output by sensor devices. The device may add, to a node in a data structure, at least some of the first data items. The device may divide the node to create subnodes that correspond to subregions of a geographic region. The device may add, to at least one of the subnodes, at least some of the second data items. The device may generate a probability of a first relationship, between the first data items and the second data items, based on determining subnodes that include a first data item and determining subnodes that exhibit a predefined second relationship with a second data item. The device may send, to another device, the probability of the first relationship to support location-based services.

20 Claims, 5 Drawing Sheets

DETERMINING A PROBABILITY OF A RELATIONSHIP BETWEEN LAYERS OF GEOGRAPHIC INFORMATION SYSTEM DATA

BACKGROUND

Geographic information systems (GIS) may organize information into layers of data. Each layer may include data items (e.g., objects of information) that share a common property (e.g., roads, traffic density, traffic accidents, restaurants, wireless network base stations, population, events, resources, or the like). Each data item may include location information.

DETAILED DESCRIPTION OF PREFERRED EMBODIMENTS

The following detailed description of example implementations refers to the accompanying drawings. The same reference numbers in different drawings may identify the same or similar elements.

Although geographic information systems may organize large quantities of information (e.g., data obtained from multiple sensor devices, which may include machine-to-machine (M2M) devices and/or Internet of Things (IoT) devices) into layers that share a common property, geographic information systems may not offer any insight with regard to possible relationships that might exist between different layers. Although two or more layers might otherwise be unrelated, the data items in the different layers may be related based on the location information associated with the data items. Implementations described herein may enable automatically determining a probability that two or more layers of geographic information system data may be related (e.g., in a causal relationship or coincidentally, as where two or more activities tend to occur at the same place and time, despite there being no direct causal relationship between the activities). Information regarding a probability that two or more layers of geographic information system data may be related may be used to support location-based services (e.g., services that may be provided based on a location where an activity is taking place), such as by using an occurrence of a first activity as a predictor of an, otherwise unrelated, second activity.

Figure 1A:
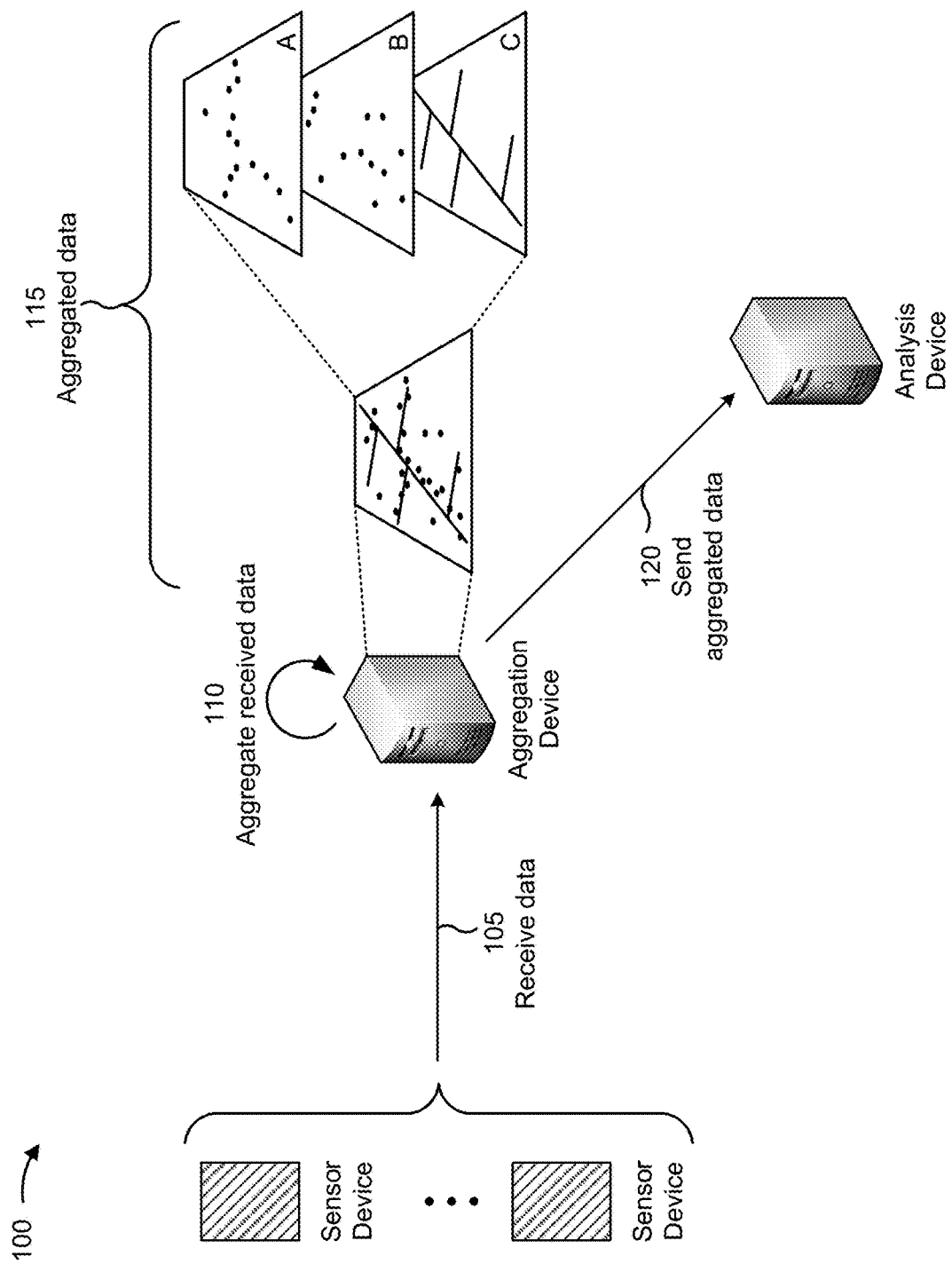
FIGS. 1A and 1B are diagrams of an overview of an example implementation described herein.
Figure 1B:
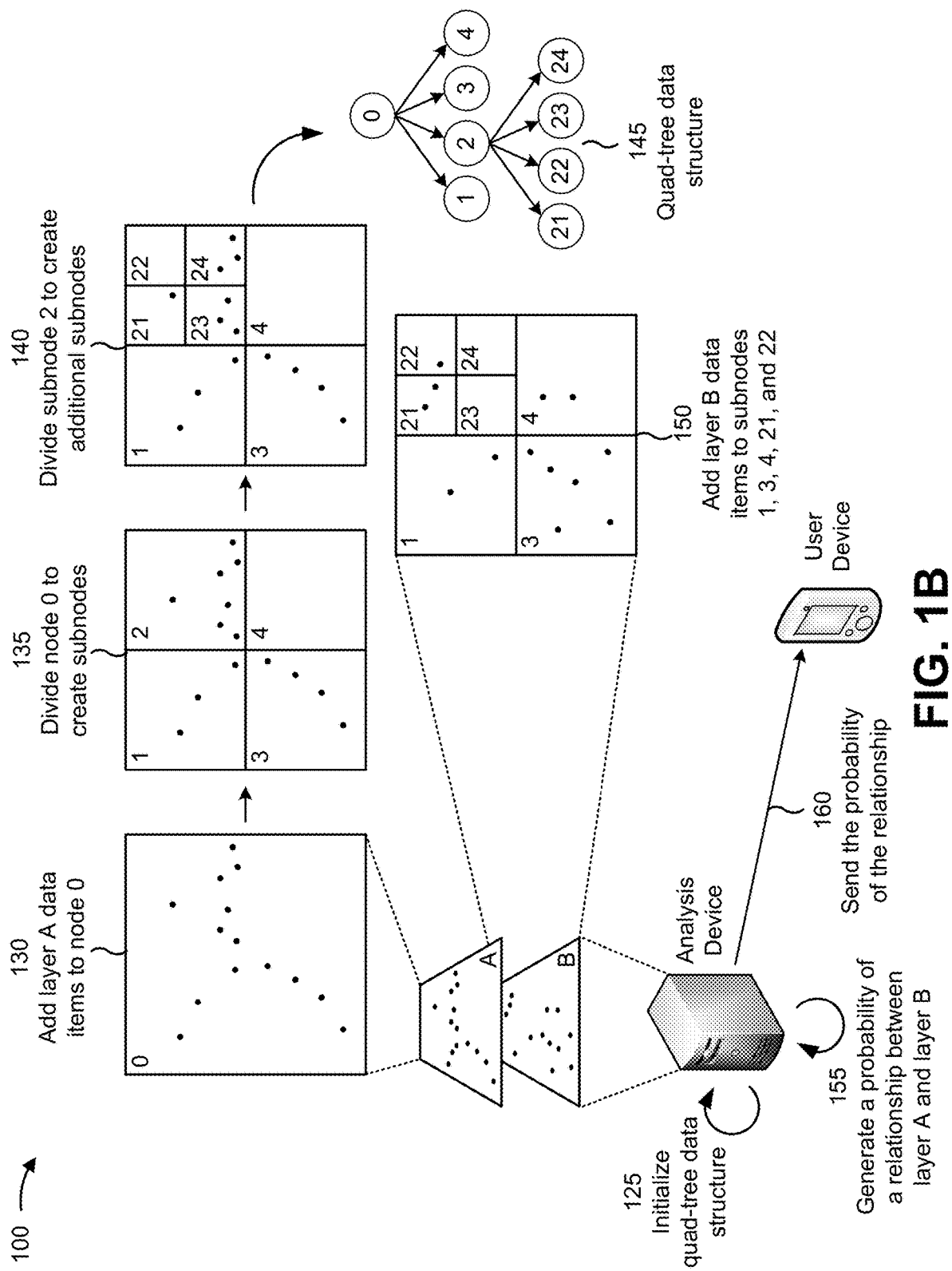

FIGS. 1A and 1B are diagrams of an overview of an example implementation 100 described herein. As shown in FIG. 1A and by reference number 105, assume that an aggregation device has received a quantity of various types of data items (e.g., corresponding to various activities) from multiple sensor devices (e.g., M2M and/or IoT devices). Further assume that location information is associated with the data items.

As shown by reference number 110, the aggregation device may aggregate the raw data, received from the sensor devices, into one or more useful formats. For example, as shown by reference number 115, the aggregation device may aggregate the data into a single layer map (e.g., with point data items and line data items shown together), or aggregate the data into layers A, B, and C based on common properties (e.g., restaurants in layer A, wireless hotspots in layer B, and roads in layer C). As shown by reference number 120, after aggregating the data, the aggregation device may send the aggregated data to an analysis device for analysis of the aggregated data.

As shown in FIG. 1B, assume that the analysis device is to determine a probability that there is a relationship between data items in layer A (e.g., restaurants) and data items in layer B (e.g., wireless hotspots), based on the aggregated data that the analysis device received from the aggregation device. As shown by reference number 125, the analysis device may initialize a quad-tree data structure (e.g., by defining an initial bounding box, a threshold number of first data items per node (e.g., five), or the like).

As further shown in FIG. 1B, the analysis device may add data items, from layer A, to node 0 (e.g., a root node of a quad-tree data structure), as shown by reference number 130 (e.g., with regard to a geographic region corresponding to the initial bounding box for node 0). After adding the data items from layer A, the analysis device may determine whether to divide node 0 to create a set of subnodes. As further shown by reference number 130, node 0 includes more than the threshold number of data items (e.g., 14>5), so analysis device may divide node 0 to create subnodes 1, 2, 3, and 4, as shown by reference number 135 (e.g., with regard to geographic subregions corresponding to the bounding boxes for subnodes 1, 2, 3, and 4). After creating subnodes 1, 2, 3, and 4, the analysis device may determine whether any of subnodes 1, 2, 3, and 4 should be divided to create additional subnodes. As further shown by reference number 135, node 2 includes more than the threshold number of data items (e.g., 7>5), so analysis device may divide node 2 to create subnodes 21, 22, 23, and 24, as shown by reference number 140 (e.g., with regard to geographic subregions corresponding to the bounding boxes for subnodes 21, 22, 23, and 24). As further shown by reference number 140, none of subnodes 1, 3, 4, 21, 22, 23, and 24 (e.g., the leaf nodes (e.g., nodes without children) of the quad-tree data structure) includes more than the threshold number of data items, so analysis device may have generated the quad-tree data structure that is shown by reference number 145.

As further shown in FIG. 1B, the analysis device may add layer B data items to subnodes 1, 3, 4, 21, and 22, with subnodes 23 and 24 receiving no layer B data items, as shown by reference number 150 (e.g., with regard to geographic subregions corresponding to the bounding boxes for subnodes 1, 3, 4, 21, 22, 23, and 24).

As further shown in FIG. 1B and by reference number 155, after the layer A data items and the layer B data items have been added to the quad-tree data structure, the analysis device may generate a probability of a relationship between layer A and layer B. For example, the analysis device may determine a number of subnodes that include a layer A data item (e.g., 5, as shown by reference number 140), and a number of subnodes that include both layer A and layer B data items (e.g., 3, as shown by reference numbers 140 and 150). The analysis device may then determine a ratio between the number of subnodes that include a layer A data item and the number of subnodes that include both layer A and layer B data items (e.g., 0.6 or 60%). Based on the ratio (e.g., 0.6 or 60%) satisfying a threshold, the analysis device may determine that there might be a relationship between layer A (e.g., restaurants) and layer B (e.g., wireless hotspots). As shown by reference number 160, the analysis device may send, to a user device, the probability that there might be a relationship between layer A and layer B.

In this way, implementations described herein may enable automatically determining a probability that two or more layers of geographic information system data may be related (e.g., in a causal or coincidental relationship). Information regarding a probability that two or more layers of geographic information system data may be related may be used to support location-based services (e.g., services that may be provided based on a location where an activity is taking place), such as by using an occurrence of a predictable activity as a predictor for an, otherwise unrelated, less predictable activity. For example, the occurrence of a sporting event may be used to predict time periods of heavy loading on specific cellular telephone base stations, which may allow more efficient, location-based, allocation of network resources. Additionally, improved prediction of activities that might result in emergency situations may enable faster emergency response times.

As indicated above, FIGS. 1A and 1B are provided merely as an example. Other examples are possible and may differ from what was described with regard to FIGS. 1A and 1B.

Figure 2:
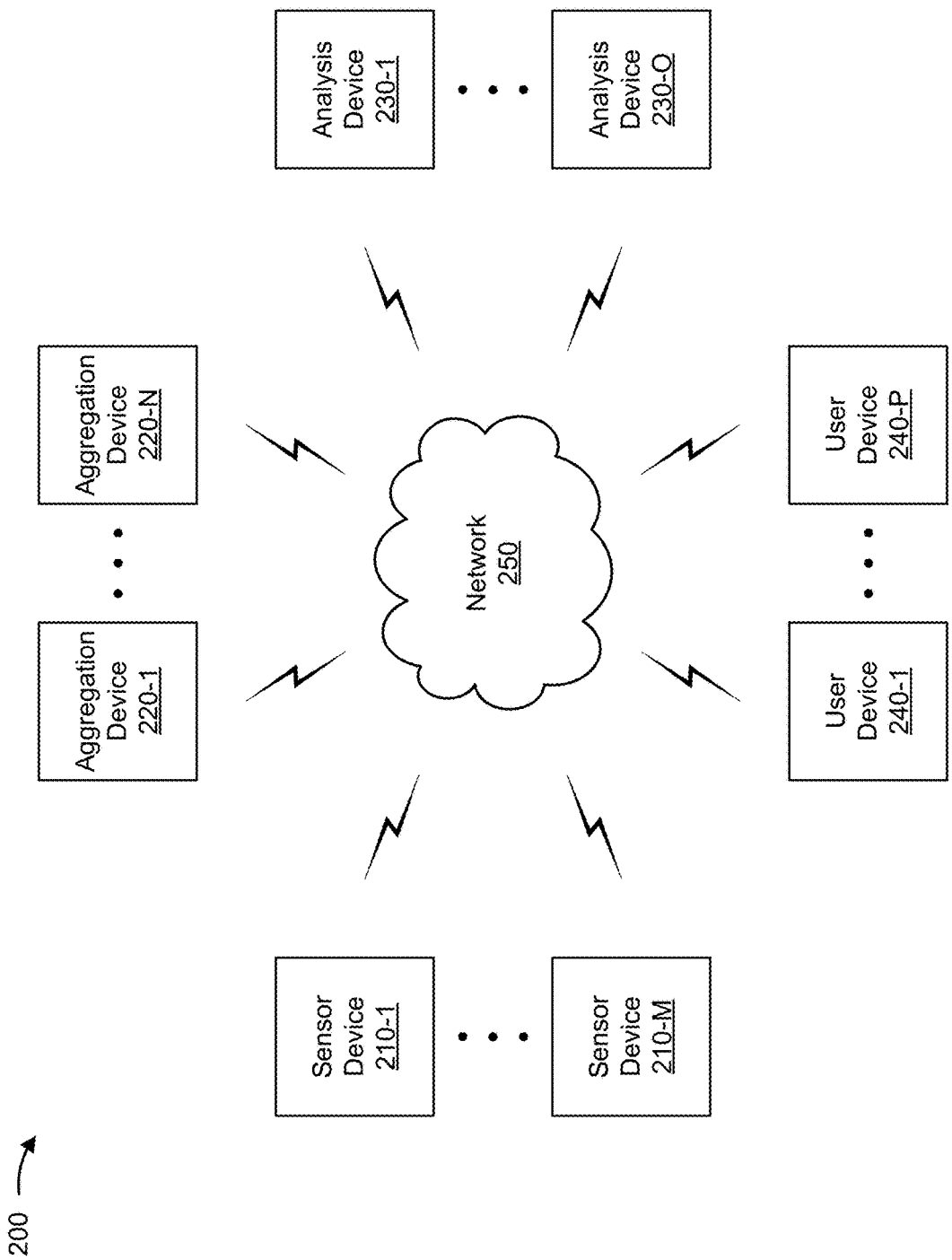
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more sensor devices 210-1 through 210-M (M≥1) (hereinafter referred to collectively as "sensor devices 210," and individually as "sensor device 210"), one or more aggregation devices 220-1 through 220-N (N≥1) (hereinafter referred to collectively as "aggregation devices 220," and individually as "aggregation device 220"), one or more analysis devices 230-1 through 230-O (O≥1) (hereinafter referred to collectively as "analysis devices 230," and individually as "analysis device 230"), one or more user devices 240-1 through 240-P (P≥1) (hereinafter referred to collectively as "user devices 240," and individually as "user device 240"), and a network 250. Devices of environment 200 may interconnect via wired connections, wireless connections, or a combination of wired and wireless connections.

Sensor device 210 includes one or more devices capable of gathering, receiving, storing, processing, providing, and/or transmitting information and/or data. For example, sensor device 210 may include a network device (e.g., a modem, a switch, a gateway, or the like), a sensing device, a metering device, a mobile phone (e.g., a smart phone, a radiotelephone, or the like), a computing device (e.g., a desktop computer, a laptop computer, a tablet computer, a handheld computer, a camera, an audio recorder, a camcorder, or the like), an appliance (e.g., a thermostat, an oven, a refrigerator, a microwave, a stove, or the like), a medical device, a biometric device, a wearable device, a car, a light bulb, a switch, an actuator, a timer, a signal detection device (e.g., to detect the presence of a signal, such as Bluetooth signal, an infrared signal, or the like), a machine-to-machine (M2M) device, and/or a similar device. In other words, sensor device 210 may be any "thing" in the IoT. In some implementations, sensor device 210 may provide, to other devices, location information associated with sensor device 210 and/or with information and/or data gathered by sensor device 210.

Aggregation device 220 includes one or more devices capable of receiving, processing, and/or providing information and/or data. For example, aggregation device 220 may include a computing device (e.g., a desktop computer, a laptop computer, a tablet computer, a handheld computer, a server computer, a smart phone, a gaming device, a computer cluster, a supercomputer, a cloud computer, or the like).

In some implementations, aggregation device 220 may receive (e.g., via network 250) data items from sensor devices 210, organize the data items to create aggregated data, and/or send (e.g., via network 250) the aggregated data to an analysis device 230. In some implementations, aggregation device 220 may be a geographic information system (GIS) capable of organizing data items, which have associated location information, into layers of data items that share a common property (e.g., roads, traffic density, traffic accidents, businesses, specific types of businesses, hotels, wireless network base stations, population, events, resources, or the like). In some implementations, aggregation device 220 may use the location information (e.g., latitude and longitude) associated with the data items to support displaying the data items on a map (e.g., a map that may be displayed on user device 240). In some implementations, aggregation device 220 may be capable of organizing data items into a suitable space-time coordinate system (e.g., latitude, longitude, and time) when the data items additionally have associated temporal location information. In some implementations, aggregation device 220 may receive IoT data from sensor device 210, organize the IoT data, and/or send the IoT data to analysis device 230.

Analysis device 230 includes one or more devices capable of receiving, processing, and/or providing information and/or data. For example, analysis device 230 may include a computing device (e.g., a desktop computer, a laptop computer, a tablet computer, a handheld computer, a server computer, a smart phone, a gaming device, a computer cluster, a supercomputer, a cloud computer, or the like). In some implementations, analysis device 230 may receive (e.g., via network 250) aggregated data from aggregation device 220, analyze the aggregated data, and/or send a result of the analysis of the aggregated data to user device 240. For example, analysis device 230 may receive, from aggregation device 220, layers of geographic information system data (e.g., aggregated data), determine a possibility of a relationship between layers of the geographic information system data, and/or send, to user device 240, the possibility of a relationship between layers of geographic information system data. In some implementations, analysis devices 230 may provide the possibility of a relationship between layers of geographic information system data (e.g., via a display, a speaker, and/or another device, such as user device 240). In some implementations, one or more analysis devices 230 may be integrated, with one or more aggregation devices 220, into a single device.

User device 240 includes one or more devices capable of communicating via a network (e.g., network 250) and displaying information (e.g., analysis results received from analysis device 230). For example, user device 240 may be a mobile communication device (e.g., a smart phone), a portable computer device (e.g., a laptop, tablet, or handheld computer), a desktop computing device, a server device, a personal gaming system, a wearable communication device (e.g., a pair of smart eyeglasses, a smart watch, or the like), or some other computing device. In some implementations, analysis device 230 may be integrated into user device 240.

Network 250 may include one or more wired and/or wireless networks. For example, network 250 may include a cellular network (e.g., a long-term evolution (LTE) network, a 3G network, a code division multiple access (CDMA) network, or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
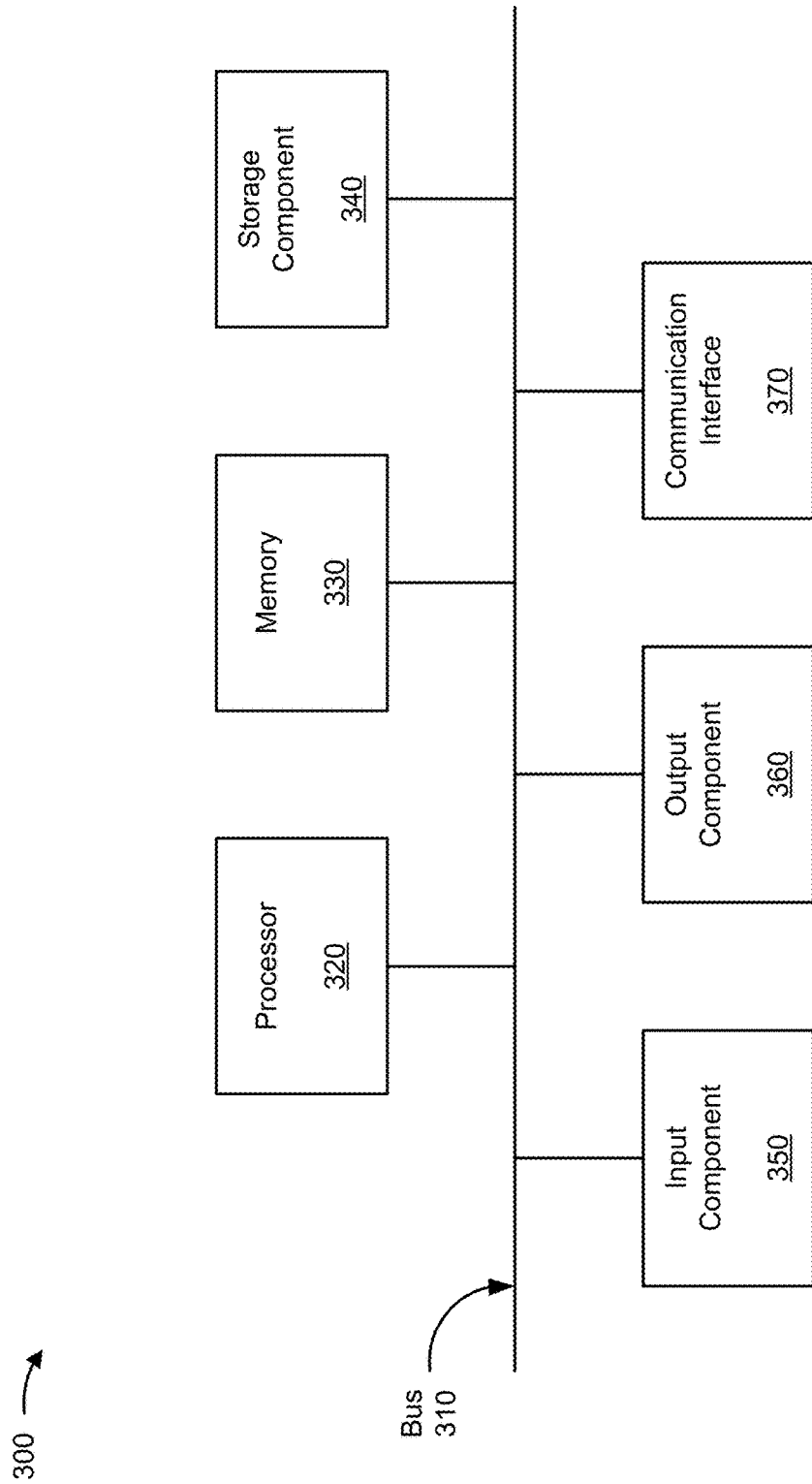
FIG. 3 is a diagram of example components of one or more devices of FIG. 2.

FIG. 3 is a diagram of example components of a device 300. Device 300 may correspond to sensor device 210, aggregation device 220, analysis device 230 and/or user device 240. In some implementations, sensor device 210, aggregation device 220, analysis device 230 and/or user device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
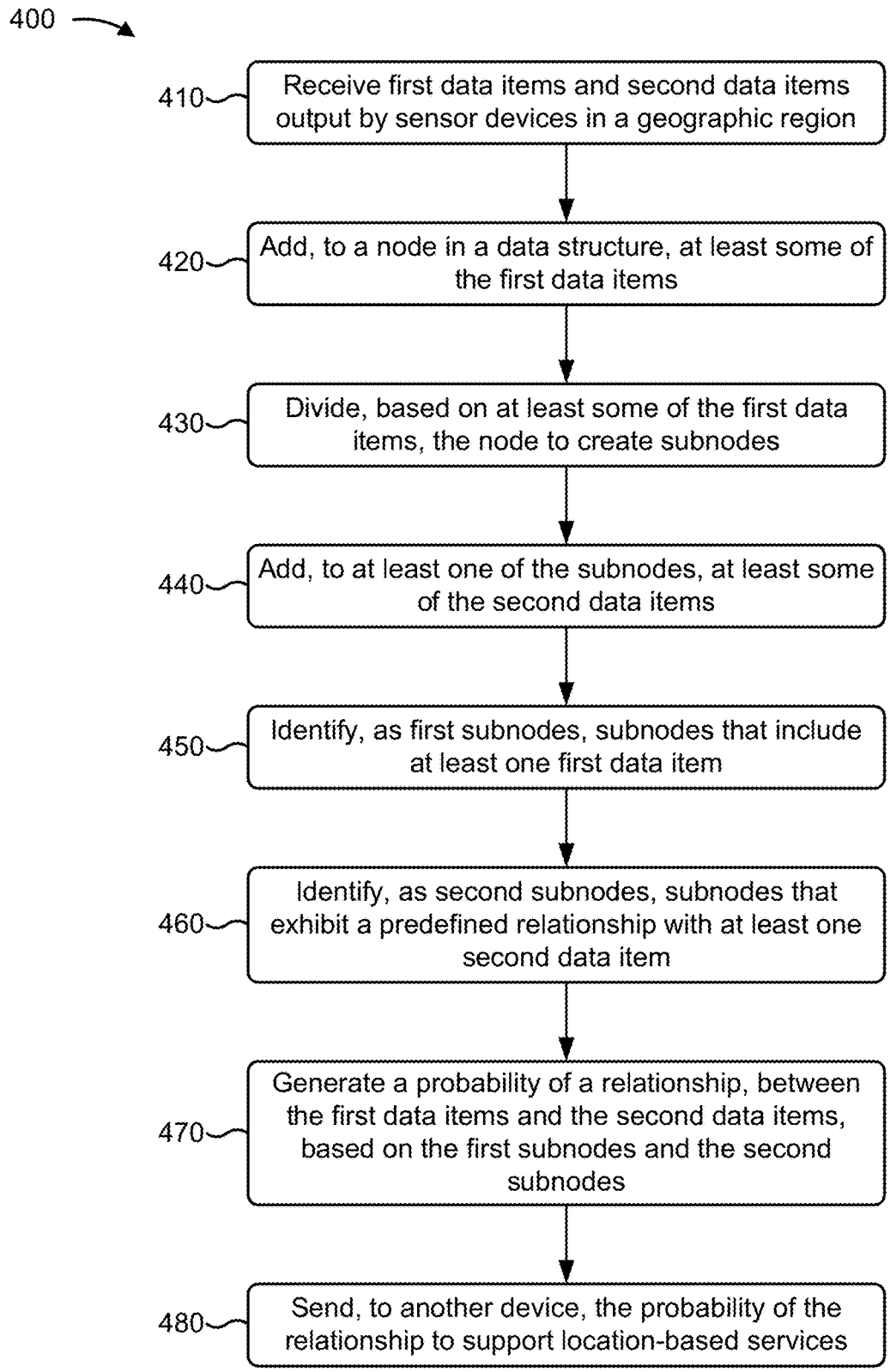
FIG. 4 is a flow chart of an example process for determining a probability of a relationship between layers of geographic information system data.

FIG. 4 is a flow chart of an example process 400 for determining a probability of a relationship between layers of geographic information system data. In some implementations, one or more process blocks of FIG. 4 may be performed by analysis device 230. In some implementations, one or more process blocks of FIG. 4 may be performed by another device or a group of devices separate from or including analysis device 230, such as sensor device 210, aggregation device 220, and/or user device 240.

As shown in FIG. 4, process 400 may include receiving first data items and second data items output by sensor devices in a geographic region (block 410). For example, analysis device 230 may receive data items from aggregation device 220. In some implementations, data items may include location information, a value (e.g., a measurement, an operational state, or another type of data obtained by sensor device 210), and/or identifying information (e.g., to identify a particular data item, a source of information for the data item, or the like).

The location information may include information to locate a data item in a suitable space and/or space-time coordinate system. For example, location information may include latitude and longitude information to provide a geographic location for the data item. In some implementations, the location information may additionally include a time. In some implementations, the location information may be based on another quantifiable system of location (e.g., building addresses, street intersections, postal codes, or the like).

In some implementations, the data items may include vector data items (e.g., point data items and line (e.g., link) data items) and/or raster data items (e.g., pixel data items). Point data items may be used to represent information that may be associated with a location (e.g., road intersections, traffic accidents, restaurants, hotels, wireless network base stations, events, or the like). Each point data item may include a value (e.g., a measured value determined by sensor device 210), location information (e.g., latitude, longitude, and/or time), a name, a data item identifier (ID), a list of link data items that are connected to the point data item, or the like.

Line data items may be used to represent information that may be associated with and/or link multiple point data items. For example, line data items may be used to represent roads or geographic boundaries. Each line data item may include data item IDs for point data items that define ends for the line data item, a name, a value (e.g., a street name for a street corresponding to the line data item), an associated traveling speed, a line data item type (e.g., a type of road), or the like.

Pixel data items may be used to represent information that has an associated area. For example, pixel data items may be used to represent land use (e.g., agricultural, residential, industrial, commercial, or the like) or types of land and/or water (e.g., grassland, forest, marsh, lake, or the like).

The data items may include first data items and second data items. For example, aggregation device 220 may aggregate data items (e.g., data items received from sensor devices 210) into categories, such as first data items and second data items.

In some implementations, the first data items may share a first common property (e.g., roads, traffic density, traffic accidents, restaurants, specific types of restaurants, hotels, wireless network base stations, population, events, resources, or the like) and the second data items may share a second common property. In some implementations, the first and second common properties may be similar (e.g., restaurants and specific types of restaurants). In some implementations, the first and second common properties may be distinct (e.g., restaurants and wireless network base stations). In some implementations, the first and second pluralities of data items may correspond, respectively, to first and second layers of geographic information system data (e.g., a restaurant layer and a wireless network base station layer).

In some implementations, aggregation device 220 may aggregate data items, based on data item type, into first data items and second data items. For example, the first data items may include vector data items (e.g., point data items and/or line data items), and the second data items may include raster data items (e.g., pixel data items). In some implementations, all of the first data items and/or all of the second data items may be of a single type (e.g., point data items, line data items, or pixel data items).

In some implementations, data items in a layer that have a linkage relationship may be linked using a graph data structure. For example, point data items (e.g., road intersections) may be linked by line data items (e.g., roads).

The data items (e.g., the first data items and the second data items) may have been output by sensor devices 210. In some implementations, aggregation device 220 may receive the data items from sensor devices 210. In some implementations, aggregation device 220 may obtain the data items, from the sensor devices 210, based on a request sent to the sensor devices 210 (e.g., by aggregation device 220, analysis device 230, and/or user device 240).

The sensor devices 210 may be located within a predefined geographic region (e.g., the entire earth, a landmass (e.g., continent or island), a nation, a state, a city, or the like). In some implementations, the geographic region may be defined based on predetermined values of latitude and longitude. For example, analysis device 230 may establish a bounding box of latitude and longitude that is large enough to cover the predefined geographic region.

As further shown in FIG. 4, process 400 may include adding, to a node in a data structure, at least some of the first data items (block 420). For example, analysis device 230 may add, to a node in a data structure, at least some of the first data items. Each node in the data structure may correspond to a geographic region (e.g., as defined by a bounding box of latitude and longitude) and may include a list of the first data items that have been added to the node. In some implementations, at least some nodes in the data structure may correspond to a geographic region in which at least some sensor devices 210 may be located.

In some implementations, the data structure may be a tree-data structure that may be used to repeatedly divide (e.g., partition) a geographic region into smaller subregions (as will be discussed below with regard to block 430). In some implementations, the data structure may be a quad-tree data structure (e.g., a tree-data structure in which each non-leaf node has four child nodes). Although example process 400 is generally described in the context of a quad-tree data structure, implementations described herein may use other types of data structures, including other tree data structures.

In some implementations, analysis device 230 may add, to a node in the data structure, at least some of the first data items based on location information for the first data items and the geographic region corresponding to the node. For example, analysis device 230 may add, to a node, first data items that have a location (e.g., latitude and longitude) that is within a bounding box (e.g., of latitude and longitude) for the node.

In some implementations, analysis device 230 may add each first data item to a node in the data structure (e.g., to nodes in the data structure or to a root node of a quad-tree data structure). In some implementations, prior to adding first data items to a node in the data structure, analysis device 230 may divide a root node of a quad-tree data structure into a set of initial nodes. Analysis device 230 may add each first data item to one of the initial nodes based on location information for the first data items and the geographic regions corresponding to the initial nodes.

In some implementations, prior to adding first data items to a node in a data structure, analysis device 230 may initialize the data structure. For example, analysis device 230 may define an initial bounding box, a predetermined threshold number of first data items per node (e.g., a threshold number of first data items for dividing the node into subnodes, as will be discussed below with regard to block 430), and a predetermined minimum subnode size.

In some implementations, the initial bounding box may define a geographic region (e.g., the predefined geographic region in which sensor devices 210 may be located) for a root node of a quad-tree data structure. For example, analysis device 230 may define an initial bounding box of latitude and longitude that is large enough to cover a selected geographic region (e.g., the entire earth, a landmass (e.g., continent or island), a nation, a state, a city, or the like).

In some implementations, the initial bounding box may be a square bounding box of latitude and longitude, which may support automated recursive division of the bounding box into smaller square regions for use with a quad-tree data structure. For example, rather than using −90 degrees to +90 degrees for latitude and −180 degrees to +180 degrees for longitude to cover the entire earth, a square bounding box of −180 degrees to +180 degrees may be used to reduce mathematical complexity when dividing the bounding box into smaller square regions. In some implementations, the size of the bounding box may be based on a power of 2 (e.g., $2^k$) that is a large enough number to cover 180 degrees with a suitable level of accuracy (e.g., decimal places). For example, to cover the entire earth, a bounding box of −268435456 (e.g., $2^{28}$) to +268435456 may be used, where 268435456 may correspond to 268.435456 degrees (e.g., to cover 180 degrees of latitude and longitude).

As further shown in FIG. 4, process 400 may include dividing, based on at least some of the first data items, the node to create subnodes (block 430). For example, analysis device 230 may divide a node (e.g., based on the first data items that were added to the node) to create subnodes. In some implementations, analysis device 230 may divide a subnode to create additional subnodes to add to the subnodes.

In some implementations, the subnodes may each correspond to a subregion of the geographic region that corresponds to the parent node of the subnodes. In some implementations, the geographic region that corresponds to a parent node may correspond to a union of the geographic subregions that correspond to the parent node's child subnodes. In other words, dividing a node to create subnodes may correspond to dividing the geographic region corresponding to the node to create geographic subregions that correspond to the subnodes.

In some implementations, when a quad-tree data structure is being used with a square geographic region, four subnodes may be created by dividing a node (or another subnode). The four subnodes may correspond to four disjoint congruent square geographic subregions (e.g., the northwest, northeast, southwest, and southeast quadrants) of the geographic region that corresponds to the parent node of the four subnodes. In other words, the geographic region that corresponds to the parent node may correspond to a union of the four disjoint congruent square geographic subregions that correspond to the four subnodes.

In some implementations, each subnode may include a subset of the first data items that were included in the subnode's parent node. For example, each subnode may include each first data item that was both included in the subnode's parent node and also geographically located inside the geographic subregion corresponding to the subnode. In some implementations, when a quad-tree data structure is being used, each subnode may include each first data item that has a location (e.g., latitude and longitude) within a bounding box (e.g., of latitude and longitude) for the geographic subregion that corresponds to the subnode. In some implementations, each subnode may include a list of the first data items that are included in the subnode.

Analysis device 230 may divide a node based on first data items that were added to the node. For example, if a node includes at least the threshold number of first data items, analysis device 230 may divide the node to create subnodes. In some implementations, if a subnode includes at least the threshold number of first data items, analysis device 230 may divide the subnode to create additional subnodes. Limiting the number of first data items that may be included in a subnode may improve searching efficiency (e.g., by using smaller geographic subregions in areas that have a high density of first data items). Improving searching efficiency may reduce processor and/or memory resources consumed in the search process.

In some implementations, the threshold number of first data items may be based on a population and distribution of first data items. For example, analysis device 230 may use a suitable cluster algorithm to determine a cluster size for the first data items, and establish the threshold number based on the cluster size.

In some implementations, the threshold number of first data items may be based on a particular data set. For example, a number between one hundred (100) and one thousand (1000) may be a suitable threshold number for use with a data set of 100 million first data items.

In some implementations, analysis device 230 may divide a node or subnode until the resulting subnodes reach the minimum subnode size. Establishing a minimum subnode size may limit the number of subnodes. Limiting the number of subnodes may improve searching efficiency, which may reduce processor and/or memory resources consumed in the search process. In some implementations, the minimum subnode size may be based on a minimum size for the geographic subregion that corresponds to the subnode.

In some implementations, analysis device 230 may determine that a subnode has reached the minimum subnode size when at least one subnode includes more than a predefined fraction of the first data items that were included in the subnode's parent node (or subnode). For example, analysis device 230 may determine that a node should not be divided, based on having reached the minimum subnode size, when one of the resulting child subnodes would include all of the first data items that were included in the parent node, which may avoid creating additional subnodes that do not improve searching efficiency. Avoiding creating additional subnodes that do not improve searching efficiency may reduce processor and/or memory resources consumed while creating subnodes.

In some implementations, analysis device 230 may repeatedly divide at least some of the subnodes, in a recursive process, until each of the subnodes either includes less than the threshold number of first data items or any subnodes that include at least the threshold number of first data items are at the minimum subnode size.

As further shown in FIG. 4, process 400 may include adding, to at least one of the subnodes, at least some of the second data items (block 440). For example, analysis device 230 may add, to subnodes in the data structure, at least some of the second data items.

In some implementations, analysis device 230 may add, to subnodes in the data structure, at least some of the second data items based on location information for the second data items and the geographic subregions corresponding to the subnodes. For example, analysis device 230 may add, to each of the subnodes, second data items that are geographically located inside the geographic subregion that corresponds to the subnode. In some implementations, analysis device 230 may add, to a subnode, data items that have a location (e.g., latitude and longitude) that is within a bounding box (e.g., of latitude and longitude) for the subnode. In some implementations, analysis device 230 may add each second data item to a node in the data structure (e.g., to one of the nodes or subnodes in the data structure or to a root node of a quad-tree data structure). In some implementations, each subnode may include a list of the second data items that have been added to the subnode.

As further shown in FIG. 4, process 400 may include identifying, as first subnodes, subnodes that include at least one first data item (block 450). For example, analysis device 230 may identify, as first subnodes, subnodes that include at least one first data item.

In some implementations, analysis device 230 may determine that a subnode includes a first data item based on the list of the first data items that are included in the subnode. In some implementations, analysis device 230 may identify a group of first subnodes that include a first data item. In some implementations, analysis device 230 may determine a number of first subnodes in the group of first subnodes.

As further shown in FIG. 4, process 400 may include identifying, as second subnodes, subnodes that exhibit a predefined relationship with at least one second data item (block 460). For example, analysis device 230 may identify, as second subnodes, subnodes that exhibit a predefined relationship with at least one second data item.

In some implementations, analysis device 230 may identify a group of second subnodes that exhibit a predefined relationship with at least one second data item. In some implementations, analysis device 230 may determine a number of second subnodes in the group of first subnodes.

In some implementations, analysis device 230 may determine that a subnode is a second subnode that exhibits a predefined relationship with at least one second data item when the subnode includes at least one first data item and at least one second data item. In some implementations, analysis device 230 may determine that a subnode is a second subnode that exhibits a predefined relationship with at least one second data item when the subnode includes at least X first data items and at least Y second data items, where X and Y are numbers greater than one. In some implementations, X may be equal to Y. In some implementations, analysis device 230 may determine that a subnode includes both a first data item and a second data item based on the list of the first data items that are included in the subnode and the list of the second data items that have been added to the subnode.

In some implementations, analysis device 230 may determine that a subnode is a second subnode that exhibits a predefined relationship with at least one second data item when the subnode includes at least one first data item and the subnode is within a predetermined distance to a second data item. In some implementations, analysis device 230 may determine that a subnode is a second subnode that exhibits a predefined relationship with at least one second data item when the subnode includes at least one first data item that is within a predetermined distance to a second data item. In some implementations, when a subnode includes multiple first data items, analysis device 230 may determine a center of location of the multiple first data items (e.g., based on an average of the latitude and longitude of the multiple first data items). Analysis device 230 may determine that the subnode exhibits a predefined relationship with at least one second data item when a second data item is within a predetermined distance from the center of location of the multiple first data items in the subnode. In some implementations, the predetermined distance may be based on a size of the subregion that corresponds to the subnode.

As further shown in FIG. 4, process 400 may include generating a probability of a relationship, between the first data items and the second data items, based on the first subnodes and the second subnodes (block 470). For example, analysis device 230 may generate a probability that there is a relationship, between the first data items and the second data items, based on comparing the first subnodes (e.g., the subnodes that include at least one first data item) to the second subnodes (e.g., the subnodes that exhibit a predefined relationship with at least one second data item).

In some implementations, analysis device 230 may generate the probability of a relationship, between the first data items and the second data items, based on a ratio of the number of second subnodes to the number of first subnodes. For example, if the ratio is greater than about 0.5 (50%), analysis device 230 may determine that the first data items and the second data items are probably related. If the ratio is less than about 0.5 (50%), analysis device 230 may determine that the first data items and the second data items are probably not related. In some implementations, the ratio may indicate an amount of relatedness between the first data items and the second data items. For example, if the ratio is less than about 0.33 (33%), analysis device 230 may determine that the first data items and the second data items are not related. If the ratio is between about 0.33 (33%) and about 0.66 (66%), analysis device 230 may determine that the first data items and the second data items are semi-related. If the ratio is greater than about 0.66 (66%), analysis device 230 may determine that the first data items and the second data items are related.

In some implementations, analysis device 230 may determine a correlation value between the first data items and the second data items. For example, analysis device 230 may determine whether the first data items and the second data items are positively or negatively related based on values that might be associated with the first data items and the second data items. In some implementations, analysis device 230 may assign, to each of the first data items and the second data items, a normalized value (e.g., between 0 and 255) that is based on a value associated with the data item. For example, the normalized value may be based on a measure of importance or severity associated with an event that was measured by sensor device 210.

In some implementations, analysis device 230 may determine that the first data items and the second data items are positively related (e.g., have a positive correlation) when analysis device 230 determines that high (or low) values associated with the first data items correspond to high (or low) values associated with the second data items. For example, analysis device 230 may determine that higher traffic volume may correspond to a higher number of traffic accidents.

In some implementations, analysis device 230 may determine that the first data items and the second data items are negatively related (e.g., have a negative correlation) when analysis device 230 determines that high values associated with the first data items correspond to low values associated with the second data item, or the reverse.

As further shown in FIG. 4, process 400 may include sending, to another device, the probability of the relationship to support location-based services (block 480). For example, analysis device 230 may send, to user device 240, the probability of the relationship (e.g., the probability value or the correlation value).

In some implementations, user device 240 may display (e.g., to a user) or otherwise use the probability of a relationship to support providing location-based services (e.g., services that may be provided, or resources that may be allocated, based on a location where an activity is taking place).

In some implementations, the probability of a relationship between the first and second data items may be used to support automatically allocating resources based on the relationship. For example, if analysis device 230 determines that first data items and second data items are related, analysis device 230 may automatically cause services to be provided to support a first activity (e.g., an activity that is associated with the first data items) based on the occurrence (or predicted occurrence) of a second activity (e.g., an activity that is associated with the second data items).

In some implementations, analysis device 230 may automatically cause services or resources to be allocated based on the occurrence (or predicted occurrence) of an event that is related (e.g., as determined by analysis device 230) to activities that might result in a need for the services or resources. For example, analysis device 230 may automatically cause network resources to be allocated based on the occurrence (or predicted occurrence) of an event that is related (e.g., as determined by analysis device 230) to heavy network usage. Automatically allocating network resources based on an event that is related to heavy network usage may more efficiently allocate network resources. In some implementations, analysis device 230 may, based on the occurrence (or predicted occurrence) of an event, automatically cause issuance of an advertisement that targets activities that analysis device 230 has determined are related to the event. Automatically causing issuance of advertisements that target related activities may allow focused distribution of advertisements. In some implementations, analysis device 230 may, based on the occurrence (or predicted occurrence) of an event, automatically cause allocation of emergency services to support incidents that analysis device 230 has determined are related to the event. Automatically causing allocation of emergency services may reduce response times to incidents that analysis device 230 has determined are related to an event.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein may enable automatically determining a probability that two or more layers of geographic information system data are related (e.g., in a causal relationship or coincidentally, as where two or more activities tend to occur at the same place and time, despite there being no direct causal relationship between the activities). Information regarding a probability that two or more layers of geographic information system data may be related may be used to support location-based services, such as by using an occurrence of a predictable activity as a predictor for an, otherwise unrelated, less predictable activity. For example, the occurrence of a heavily attended event may be used to predict time periods of heavy loading on specific cellular telephone base stations, which may allow more efficient, location-based, allocation of network resources. Additionally, improved prediction of activities that might result in emergency situations may enable faster emergency response times.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
      receive a plurality of first data items and a plurality of second data items,
         the plurality of first data items and the plurality of second data items having been output by a plurality of sensor devices in a geographic region;

add, to a node in a data structure and based on first location information for the plurality of first data items, at least some of the plurality of first data items;

divide, based on the at least some of the plurality of first data items, the node to create a plurality of subnodes, each subnode corresponding to a subregion of the geographic region;

add, to at least one of the plurality of subnodes and based on the corresponding subregions and second location information for the plurality of second data items, at least some of the plurality of second data items;

generate a probability of a first relationship, between the plurality of first data items and the plurality of second data items, based on determining a first quantity of subnodes that include at least one of the plurality of first data items, determining a second quantity of subnodes that exhibit a predefined second relationship with at least one of the plurality of second data items, and comparing the first quantity and the second quantity; and send, to another device, the probability of the first relationship to support location-based services.

2. The device of claim 1,
where each of the plurality of subnodes includes less than a threshold quantity of the plurality of first data items; and
where each of the plurality of subnodes has at least a minimum size.

3. The device of claim 1,
where the data structure is a quad-tree data structure.

4. The device of claim 1,
where the plurality of first data items is a first plurality of first data items;
where the plurality of subnodes is a first plurality of subnodes;
where one of the first plurality of subnodes includes a second plurality of first data items; and
where the one or more processors are further to:
divide, before adding the at least some of the plurality of second data items and based on the at least some of the second plurality of first data items, the one of the first plurality of subnodes to create a second plurality of subnodes.

5. The device of claim 1,
where comparing the first quantity and the second quantity includes
determining a ratio of the second quantity and the first quantity; and
where the one or more processors, when generating the probability of the first relationship, are to:
generate the probability of the first relationship based on the ratio.

6. The device of claim 1,
where the at least one of the plurality of first data items is a first at least one of the plurality of first data items; and
where the one or more processors, when determining the subnodes that exhibit the predefined second relationship with the at least one of the plurality of second data items, are to:
determine the subnodes that include the at least one of the plurality of second data items and a second at least one of the plurality of first data items.

7. The device of claim 1,
where the at least one of the plurality of first data items is a first at least one of the plurality of first data items; and where the one or more processors, when determining the subnodes that exhibit the predefined second relationship with the at least one of the plurality of second data items, are to:
determine subnodes that include a second at least one of the plurality of first data items and are within a predetermined distance from the at least one of the plurality of second data items.

8. A non-transitory computer-readable medium storing instructions, the instructions comprising:
one or more instructions that, when executed by one or more processors, cause the one or more processors to:
receive a plurality of first data items and a plurality of second data items,
the plurality of first data items and the plurality of second data items having been output by a plurality of sensor devices in a geographic region;
add the plurality of first data items to at least one node in a data structure based on first location information for the plurality of first data items;
divide, based on the plurality of first data items, the at least one node to create a plurality of subnodes,
each subnode corresponding to a subregion of the geographic region;
add at least some of the plurality of second data items to the plurality of subnodes based on the corresponding subregions and second location information for the plurality of second data items;
identify a first group of subnodes,
the first group of subnodes including at least one of the plurality of first data items;
identify a second group of subnodes,
the second group of subnodes including subnodes that exhibit a first relationship with at least one of the plurality of second data items;
generate a probability of a second relationship, between the plurality of first data items and the plurality of second data items, based on determining a first quantity of subnodes in the first group of subnodes, determining a second quantity of subnodes in the second group of subnodes, and comparing the first quantity and the second quantity; and
send, to another device, the probability of the second relationship to support location-based services.

9. The non-transitory computer-readable medium of claim 8,
where each of the plurality of subnodes includes less than a threshold quantity of the plurality of first data items; and
where the subregion corresponding to each of the plurality of subnodes is at least as large as a minimum size.

10. The non-transitory computer-readable medium of claim 8,
where the data structure is a quad-tree data structure.

11. The non-transitory computer-readable medium of claim 8, where the one or more instructions, when executed by the one or more processors, further cause the one or more processors to:
assign a first normalized value to the at least one of the plurality of first data items;
assign a second normalized value to the at least one of the plurality of second data items; and
determine a correlation between the at least one of the plurality of first data items and the at least one of the plurality of second data items based on the first normalized value and the second normalized value.

12. The non-transitory computer-readable medium of claim 8,
where the one or more instructions, when executed by the one or more processors, further cause the one or more processors to:
determine a ratio of the second quantity of subnodes to the first quantity of subnodes; and
where the one or more instructions, that cause the one or more processors to generate the probability of the second relationship, cause the one or more processors to:
generate the probability of the second relationship based on the ratio.

13. The non-transitory computer-readable medium of claim 8,
where the at least one of the plurality of first data items is a first at least one of the plurality of first data items; and
where the subnodes that exhibit the first relationship with the at least one of the plurality of second data items include the at least one of the plurality of second data items and a second at least one of the plurality of first data items.

14. The non-transitory computer-readable medium of claim 8,
where the at least one of the plurality of first data items is a first at least one of the plurality of first data items; and
where the one or more instructions, that cause the one or more processors to identify the second group of subnodes, cause the one or more processors to:
identify subnodes that include a second at least one of the plurality of first data items and are within a predetermined distance from the at least one of the plurality of second data items.

15. A method, comprising:
receiving, by a device and from a first other device, a plurality of first data items and a plurality of second data items,
the plurality of first data items and the plurality of second data items having been obtained, by the first other device, from a plurality of sensor devices in a geographic region;
adding, by the device, to at least one node in a data structure, and based on first location information for the plurality of first data items, at least some of the plurality of first data items;
dividing, by the device and based on the at least some of the plurality of first data items, the at least one node to create a plurality of subnodes,
each subnode corresponding to a subregion of the geographic region;
adding, by the device, to at least one of the plurality of subnodes and based on the corresponding subregions and second location information for the plurality of second data items, at least some of the plurality of second data items;
determining, by the device, subnodes that include at least one of the plurality of first data items;
determining, by the device, subnodes that exhibit a first relationship with at least one of the plurality of second data items;
generating, by the device, a probability of a second relationship, between the plurality of first data items and the plurality of second data items, based on comparing a first quantity of the subnodes that include the at least one of the plurality of first data items and a second quantity of the subnodes that exhibit the first relationship; and
sending, by the device and to a second other device, the probability of the first relationship to support location-based services.

16. The method of claim 15,
where dividing the at least one node to create the plurality of subnodes comprises:
recursively dividing the at least one node to create the plurality of subnodes;
where each subnode includes less than a threshold quantity of the plurality of first data items; and
where the subregion corresponding to each subnode is at least as large as a minimum size.

17. The method of claim 15,
where the data structure is a tree data structure.

18. The method of claim 15,
further comprising:
determining a ratio of the second quantity and the first quantity; and
where generating the probability of the second relationship comprises:
generating the probability of the second relationship based on the ratio.

19. The method of claim 15,
where the at least one of the plurality of first data items is a first at least one of the plurality of first data items; and
where determining the subnodes that exhibit the first relationship with the at least one of the plurality of second data items comprises:
determining the subnodes that include the at least one of the plurality of second data items and a second at least one of the plurality of first data items.

20. The method of claim 15,
where the at least one of the plurality of first data items is a first at least one of the plurality of first data items; and
where determining the subnodes that exhibit the first relationship with the at least one of the plurality of second data items comprises:
determining subnodes that include a second at least one of the plurality of first data items and have a center of location that is within a predetermined distance from the at least one of the plurality of second data items.

* * * * *